United States Patent [19]

Iida

[11] 4,383,064
[45] May 10, 1983

[54] FLAME RETARDANT POLYAMIDE COMPOSITION

[75] Inventor: Hiroshi Iida, Nagoya, Japan

[73] Assignee: Toray Industries, Inc., Tokyo, Japan

[21] Appl. No.: 880,066

[22] Filed: Feb. 22, 1978

[30] Foreign Application Priority Data

| | | | |
|---|---|---|---|
| Mar. 3, 1977 | [JP] | Japan | 52/23090 |
| Aug. 8, 1977 | [JP] | Japan | 52/94132 |
| Dec. 29, 1977 | [JP] | Japan | 52/159104 |

[51] Int. Cl.$^3$ .............................................. C08K 5/34
[52] U.S. Cl. .................................... 524/100; 524/222; 524/291
[58] Field of Search ............... 260/45.8 NT, 45.85 B; 524/100, 222, 291

[56] References Cited

U.S. PATENT DOCUMENTS

| | | | |
|---|---|---|---|
| 2,929,816 | 3/1960 | Chamberlain | 8/107 |
| 3,493,633 | 2/1970 | Lange | 260/857 |
| 3,594,448 | 7/1971 | Birenzvige et al. | 260/45.85 B |
| 3,793,289 | 2/1974 | Koch et al. | 260/45.8 NT |
| 3,859,380 | 1/1975 | Crescentini et al. | 260/45.85 B |
| 3,959,219 | 5/1976 | Aoyama et al. | 260/45.8 NT |
| 3,980,616 | 9/1976 | Kimura et al. | 260/45.8 NT |
| 4,001,177 | 1/1977 | Tsutsumi et al. | 260/45.8 NT |
| 4,051,196 | 9/1977 | Wells et al. | 524/222 |
| 4,298,518 | 11/1981 | Ohmura et al. | 260/45.8 NT |

*Primary Examiner*—John Kight, III
*Assistant Examiner*—R. A. White
*Attorney, Agent, or Firm*—Austin R. Miller

[57] ABSTRACT

Disclosed is a flame retardant polyamide composition having desirable mechanical, electrical and processing properties, and therefore, being useful for producing parts of electric and electronic devices and appliances. The composition comprises a polyamide resin matrix and 1 to 40%, based on the weight of the polyamide matrix, of a flame-retarding agent in the form of fine particles dispersed in the matrix. The composition is characterized in that the flame-retarding agent consists of at least one member selected from:
(A) crystals of addition salts of cyanuric acid or isocyanuric acid with melamine, and;
(B) mixed crystals of addition salts of cyanuric acid or isocyanuric acid with a mixture of melamine and acetoguanamine in an amount by mole not larger than that of the melamine.

4 Claims, No Drawings

FLAME RETARDANT POLYAMIDE COMPOSITION

FIELD OF THE INVENTION

The present invention relates to a flame-retardant polyamide composition. More particularly, the present invention relates to a flame-retardant polyamide composition useful for producing parts of electric and electronic devices and appliances.

Conventional polyamide resins have excellent mechanical strength, for example, resistance to abrasion, excellent chemical properties, for example, resistance to oil, and excellent electrical properties, for example, resistance to electric arc, and therefore, are useful in various industrial fields. Also, the conventional polyamide resins have an advantage in that their flame resistance is higher than that of hydrocarbon resins, for example, polyolefin resins and polystyrene resins. That is, when the conventional polyamide resins are brought into contact with a flame, a small amount of smoke is generated and the heat of combustion is relatively small. Accordingly, the polyamide resins are useful for producing parts of electric and electronic devices and appliances.

However, recently, the plastic materials usable for producing parts of electric and electronic devices and appliances are required to have a very high level of flame-retarding property. Under these circumstances, it is desirable that the flame-retarding property of the polyamide resins be increased to such a level that the polyamide resins can satisfy the requirements specified in UL 94, of Underwriters Laboratories Inc., U.S.A.

In conventional methods for improving the flame-retarding property of plastic materials, various flame-retarding agents, for example, halogen-containing organic compounds, phosphorous-containing organic compounds, nitrogen-containing organic compounds or inorganic compounds, for example, antimony oxide, lead oxide, tin oxide, zinc ferrite and magnesium ferrite, are blended with the plastic materials. When the halogen-containing organic compounds are blended with polyamide resins, there is a disadvantage in that the halogen-containing organic compounds should be used in a large amount, for example, 20 to 40% by weight. This large content of the halogen-containing organic compounds in polyamide resins causes the mechanical properties, for example, tensile strength and impact strength, and the electric properties, for example, resistance to arc, of the resultant polyamide compositions to be decreased. Also, some of the halogen-containing organic compounds are toxic or harmful to the human body, and when the halogen-containing organic compounds are blended with polyamide resins at a high temperature, or polyamide compositions containing the halogen-containing organic compounds are shaped or molded at a high temperature, some of the halogen-containing organic compounds generate decomposition products which are toxic or harmful to the human body and/or corrosive to metallic materials used in the blending and molding or shaping machines.

In other methods, nitrogen-containing organic compounds are blended, as the flame-retarding agent, with polyamide resins. The nitrogen-containing flame-retarding agents may be selected from, for example, melamine, cyanuric acid and isocyanuric acids. The above-mentioned nitrogen-containing organic compounds are relatively cheap, harmless to the human body and effective for improving, with a relatively small amount thereof, the flame-retarding property of the polyamide resins. The small nitrogen content of these flame-retarding agents does not cause the mechanical and electrical properties of the polyamide composition to decrease. Also, when a polyamide composition including a nitrogen-containing flame-retarding agent is brought into contact with a flame, smoke is generated in a very small amount and no harmless decomposition products are generated. However, these type of flame retardant polyamide compositions have the following disadvantages.

The melamine has a great tendency to sublimate when the polyamide composition is blended with the melamine, or when the resultant composition is shaped or molded at a temperature higher than the melting point of the polyamide resin, for example, 250° to 300° C. The sublimated melamine vapor is solidified on the outside portion of the composition, and is deposited on and soils the surfaces of the blending machine, the shaping or molding machines and the resultant shaped or molded articles. Also, the melamine contained in the polyamide composition article tends to move from the inside to the surface portion of the article and forms white blooms consisting of crystals of the melamine on the surface of the article, at a high temperature, regardless of the presence or the absence of a high moisture content.

The cyanuric and isocyanuric acids have a tendency to foam in the polyamide composition at a high temperature, for example, higher than 230° C., and to decrease the viscosity of the melt of the polyamide composition. The decrease in the viscosity causes the melt of the polyamide composition to drip from the die through which the melt is extruded or injected. Sometimes, the cyanuric and isocyanuric acids cause the polyamide composition to be coloured at a high temperature. Therefore, the blending and shaping or molding operations of the polyamide composition containing the cyanuric and isocyanuric acids are restricted to special temperatures of 230° C. or lower. Accordingly, the polyamides to which the cyanuric and isocyanuric acids can be practically blended are restricted to ones having relatively low melting points. Furthermore, the cyanuric and isocyanuric acids contained in the polyamide composition have a tendency to bleed from the inside to the surface portion of the polyamide composition article at high temperatures, even in dry conditions or in high humidity conditions.

Additionally, it should be noted, the cyanuric and isocyanuric acids have a relatively poor thermal stability and tend to sublimate at a high temperature. Also, the above-mentioned compounds and the melamine have a certain solubility in hot water. Therefore, when the polyamide composition containing the melamine or the cyanuric and isocyanuric acids is heated to a high temperature or treated with hot water, the content of the above-mentioned compounds in the polyamide composition will decrease.

Accordingly, it is desirable in the polyamide industry field, to eliminate all of the aforementioned disadvantages from polyamide compositions.

Therefore, an object of the present invention is to provide a flame retardant polyamide composition having an excellent molding or shaping property, and mechanical and electrical properties which are the same as those of the polyamide resin alone in the composition.

Another object of the present invention is to provided a flame retardant polyamide composition which generates no toxic, harmful or corrosive gas when the composition is melted at a high temperature or brought into contact with a flame.

A further object of the present invention is to provide a flame retardant polyamide composition from which no flame-retarding agent sublimates even at a high temperature.

A still further object of the present invention is to provide a flame retardant polyamide composition capable of forming a shaped or molded article wherein the flame-retarding agent does not bleed from the inside to the surface portion thereof and form white blooms.

The above-mentioned objects can be attained by the flame retardant polyamide composition of the present invention, which comprises, a polyamide resin as a matrix, and 1 to 40% based on the weight of the polyamide matrix, of a flame-retarding agent in the form of fine particles dispersed in the polyamide matrix, the flame-retarding agent consisting of at least one member selected from the group consisting of:

(A) crystals of addition salts of an acid component selected from cyanuric acid and isocyanuric acid with a basic component consisting of melamine, and;

(B) mixed crystals of addition salts of an acid component selected from cyanuric acid and isocyanuric acid, with a basic component consisted of a mixture of melamine and acetoguanamine, the molar amount of said acetoguanamine in said mixture being not larger than that of the melamine. The term "acetoguanamine" used herein refers to 2,4-diamino-6-methyl-s-triazine.

The above-mentioned simple crystals (A) of the addition salt of the acid component selected from cyanuric and isocyanuric acids, with the basic component consisting of melamine, is prepared by: completely dissolving the cyanuric or isocyanuric acid in a solvent, for example, hot water, hot ethanol, or dimethyl formamide, and; adding the melamine in the same amount by mole as that of the cyanuric or isocyanuric acid to the solution. This procedure allows the cyanuric or isocyanuric acid and the melamine to form an addition salt thereof, and also, allows the resultant addition salt to form simple crystals and precipitate from the solution.

The mixed crystals (B) of addition salts of the acid component selected from cyanuric acid or isocyanuric acid, with the basic component selected from mixtures of melamine and acetoguanamine, can be prepared by: completely dissolving the cyanuric acid or isocyanuric acid in a solvent, for example, hot water, hot ethanol, dimethylformamide and dimethyl sulfoxide; mixing the melamine with the acetoguanamine the amount by mole of which is not larger than that of the melamine, so as to provide a uniform mixture, and; adding the mixture to the above-prepared solution. This procedure causes the resultant different addition salts to form mixed crystals and, also, causes the resultant mixed crystals to deposit from the solution.

Mixtures of simple crystals of addition salts of melamine with cyanuric acid or isocyanuric acid and acetoguanamine with cyanuric acid or isocyanuric acid, are useless for the polyamide composition of the present invention. This is because the use of this type of mixture causes the simple crystal particles of the acetoguanamine salts to move from the inside to the surface portion of the polyamide composition article during a long period of storage and form white blooms on the surface of the article.

The polyamide resins usable as a resinous matrix for the composition of the present invention may be selected from homo- and co-polyamides prepared by polycondensation of lactams, aminocarboxylic acids, and/or salts of diamines and dicarboxylic acids, and mixtures of two or more of the above-mentioned homo- and co-polymers. Polycaproamide (nylon 6) and polyhexamethyleneadipamide (nylon 66) are typical polyamides usable for the present invention. Other homopolyamides, for example, nylon 4, nylon 8, nylon 11, nylon 12, nylon 69, nylon 610 and nylon 612, copolymers and terpolymers containing at least one of the above-mentioned polyamides, for example, nylon 6/66, nylon 6/12 nylon 6/6T (wherein the symbol T means terephthalic acid), nylon 66/BAC6 (wherein the symbol BAC means 1,3- or 1,4-bis-aminomethylcyclohexane), nylon 6/66/12 and nylon 6/610/PACM10 (wherein the symbol PACM represents 4,4'-diaminodicyclohexylmethane) are also useful for the present invention. From the point of view of cost and physical and chemical properties, the preferable polyamides for the present invention are nylon 6, nylon 6/66, nylon 610, nylon 11, and nylon 12.

In the polyamide composition of the present invention, the flame-retarding agent is uniformly contained in an amount of from 1 to 40%, preferably, 3 to 30%, more preferably, 5 to 30%, based on the weight of the polyamide matrix. If the flame-retarding agent is used in an amount less than 1%, the flame-retarding property of the resultant polyamide composition will be unsatisfactory. Also, when the content of the flame-retarding agent is larger than 40%, the resultant polyamide composition will be much poorer in its mechanical and electrical properties than those of the polyamide matrix alone.

In the flame retardant polyamide composition of the present invention, the flame-retarding agent should be uniformly dispersed in the form of fine particles in the polyamide matrix. It is preferable that the size of the fine particles of the flame-retarding agent not be larger than 20 microns, more preferably, from 0.1 to 20 microns. The fine particles of the flame-retarding agent before dispersion in the polyamide matrix are referred to hereinafter as primary particles of the flame-retarding agent. When the primary particles of the flame-retarding agent are dispersed in the polyamide matrix at a high temperature, the primary particles tend to aggregate with each other so as to form secondary particles having a larger size than that of the primary particles. Accordingly, it is preferable that the polyamide composition of the present invention contains not more than 10, more preferably, not more than 5, secondary particles having a size larger than 50 microns, per mg of the polyamide composition. When the polyamide composition contains more than 10 secondary particles having a size of 50 microns or more, the resultant polyamide composition article sometimes has a rough surface appearance and a poor flame-retarding property.

In order to uniformly disperse the flame-retarding agent in the polyamide resin while preventing the formation of the large size secondary particles of the flame-retarding agent, fine particles of the flame-retarding agent are mixed with fine particles of the polyamide resin having, for example, a size of from 100 to 200 microns, and; the resultant mixture is kneaded in a kneader, monoaxial extruder or biaxial extruder at a temperature higher than that of the polyamide resin. In the dispersing process, the polyamide resin in the form of chips or pellets is mixed with the fine particles of the flame-retarding agent, and then, the mixture is melted and kneaded in a biaxial extruder. Otherwise, the mixture of the chips or pellets of the polyamide resin and the fine particles of the flame-retarding agent is fed into the mono- or biaxial extruder, in such a manner that the mixture is fed at a feeding rate not high enough for filling the inside space of the extruder, and melted and kneaded in the extruder. This method is referred to hereinafter as a hunger feeding method. Of all of the above mentioned methods, this hunger feeding method is most preferable for preparing the flame retardant polyamide composition of the present invention in which the flame-retarding agent is dispersed in the most uniform condition in the polyamide resin matrix.

In comparison with the above-mentioned methods, other methods in which the flame-retarding agent and the polyamide resin are separately fed into the extruder or kneader, or in which a mixture of the fine particles of the flame-retarding agent and the chips or pellets of the polyamide resin is fed to a monoaxial extruder in such a manner that the inside space of the extruder is always completely filled with the mixture, are not preferable. This is because these methods result in non-uniform dispersion of the flame-retarding agent in the polyamide matrix.

The fine particles of the flame-retarding agent may be uniformly dispersed in the polyamide matrix by the assistance of a dispersing agent which is effective for preventing the aggregation of the primary particles of the flame-retarding agent.

The dispersing agent usable for the present invention is not limited to a special group of compounds as long as the compounds are effective for dispersing the flame-retarding agent in a small amount, and have no effect on the mechanical, electrical and flame-retarding properties of the polyamide composition. The preferable dispersing agent for the composition of the present invention can be selected from hindered phenol compounds which are useful as antioxidants and which are commercially available as, for example, IRGANOX 1010, 1098, 1076, 1222 and 259 (Trademarks of antioxidants made by Ciba-Geigy). The dispersing agent is used in an amount of 0.1 to 3.0%, more preferably, 0.3 to 2.0%, based on the weight of the polyamide resin matrix.

The polyamide composition of the present invention may contain certain additives, in addition to the polyamide resin, the flame-retarding agent and, if necessary, the dispersing agent, as long as the additives do not obstruct the uniform dispersion of the flame-retarding agent. The additives may include: coloring agents, for example, titanium dioxide and carbon black; fillers, for example, glass fibers; plasticizers; anti-oxidants; ultraviolet ray-absorbing agents; releasing agents; lubricants, such as metal salts of stearic acid; anti-static agents, and; heat-stabilizing agents. The heat-stabilizing agents may be selected from: copper-containing compounds which are effective for heat-stabilizing ordinary polyamide resins, for example, copper iodide, copper sulfate, copper acetate and copper stearate. The copper compounds mentioned above may be used together with an alkali metal or alkaline earth metal.

The polyamide composition of the present invention is preferably molded or shaped at a temperature not exceeding 300° C., more preferably, not exceeding 270° C., still more preferably, not exceeding 260° C., because the flame-retarding agent sometimes tends to be decomposed at a temperature higher than 300° C.

The present invention is further illustrated by the following examples.

In the examples, the flame-retarding property of the polyamide compositions were evaluated in accordance with the Vertical Burning Test for Classifying Material, specified by UL Subject 94, published in 1974, by Underwriters Laboratories Inc., USA. The mechanical properties of the polyamide compositions were determined in accordance with ASTM methods referred to in the examples.

EXAMPLES 1 THROUGH 7 AND COMPARATIVE EXAMPLES 1 THROUGH 4

In Example 1, 1290 g (10 moles) of isocyanuric acid were dissolved in 60 liters of hot water at a temperature of 90° C. 1260 g (10 moles) of melamine in the form of fine powder were added to the solution and the resultant slurry was stirred for 60 minutes at the above-mentioned temperature. The slurry was filtered to obtain a white cake. The white cake was dried at a temperature of 70° C. under vacuum, and the dried cake was pulverized. A flame-retarding agent consisting of fine particles of the simple crystals of the melamine-cyanuric acid addition salt, having an average size of 1 to 5 microns was obtained.

100 parts by weight of nylon 6 resin powder having a relative viscosity ($\eta r$) of 2.7, which had been determined in a solution of 1 g of the resin in 100 ml of concentrated sulfuric acid at a temperature of 25° C., were uniformly mixed with 1 part of the above-prepared flame-retarding agent. The mixture was fed into a double screw (bi-axial) extruder, having an inside diameter of 50 mm, and was melted and kneaded at a temperature of 240° C. The melt was extruded in the form of a strand. The strand was solidified in a cooling water bath, and, then, cut to form pellets.

The pellets prepared as described above were melted at a temperature of 250° C. and converted into a number of plate specimens having a length of 5 inches, a width of ½ inch and a thickness of 1/16 inch. Five specimens prepared as described above were subjected to the vertical burning test of UL 94, in which a specimen is held vertically at its top end by a clamp, a flame having a length of 2 cm is brought into contact with the bottom end of the specimen, and the contact is maintained for 10 seconds. The above mentioned burning operation was carried out twice for each specimen. The flammability of the specimen was indicated by the combustion time in seconds of the specimen after withdrawing the test flame from the specimen.

Other specimens were subjected to a dry heat aging test in which the specimens were heated at a temperature of 80° C. for 72 hours. After the aging was completed, the specimens were inspected to determine whether the aging resulted in movement of the flame-retarding agent from the inside to the surface portion of each of the specimens and form white blooms on the surfaces.

Additional specimens were subjected to a high humidity aging test in which the specimens were maintained at a temperature of 40° C., in a relative humidity of 90%, for 72 hours. After the aging was completed, the five specimens were inspected to determine whether the humidity aging caused the flame-retarding agent to move from the inside to the surface portion of each of the specimens and form white blooms on the surfaces.

Still further specimens were subjected to a tensile strength test in accordance with ASTM D-638-56T and to an impact strength test in accordance with ASTM D-256-56.

The results of the above-mentioned tests are shown in Table 1.

In each of Comparative Example 2 and Examples 2 through 7, the same procedures as those mentioned in Example 1 were carried out, except that the flame-retarding agent was used in an amount indicated in Table 1. The results are shown in Table 1.

In Comparative Example 1, the same procedures as those mentioned in Example 1 were carried out, except that no flame-retarding agent was used.

In Comparative Example 3, the same procedures as those mentioned in Example 1 were carried out, except that 10 parts of melamine were used as the flame-retarding agent in place of the melamine-cyanuric acid addition salt.

In Comparative Example 4, the same procedures as those mentioned in Example 1 were carried out, except that 5 parts of cyanuric acid were used as the flame-retarding agent in place of the melamine-cyanuric acid addition salt.

The results of the above comparative examples are indicated in Table 1.

shown in Table 2, was melted at a temperature of 250° C., in a single screw (monoaxial) extruder, having an inside diameter of 65 mm. The results are shown in Table 2.

In Comparative Example 5, the same procedures as those mentioned in Example 8 were carried out, except that no flame-retarding compound was blended with the copolymer.

In Comparative Example 6, the same procedures as those described in Example 8 were carried out, except that 10 parts by weight of melamine were used in place of the melamine-cyanuric acid addition salt.

In Comparative Example 7, the same procedures as those mentioned in Example 8 were carried out, except that 5 parts by weight of cyanuric acid were used in place of the melamine-cyanuric acid addition salts. The results of the above-mentioned comparative examples are shown in Table 2.

TABLE 1

| Example No. | Flame-retarding agent Type | Amount (part) | Flammability (sec.) | Formation of white blooms on specimen surface after aging test Dry heat | High humidity | Mechanical strength Tensile strength (kg/cm$^2$) | Impact strength (kgcm/cm) |
|---|---|---|---|---|---|---|---|
| Comparative Example 1 | — | none | 34 | no | no | 760 | 6 |
| Comparative Example 2 | Melamine-cyanuric acid addition salt | 0.5 | 30 | no | no | 760 | 5.6 |
| Example 1 | | 1 | 17 | " | " | 780 | 5.5 |
| Example 2 | | 3 | 9 | " | " | 780 | 5.2 |
| Example 3 | | 5 | 3 | " | " | 790 | 5.1 |
| Example 4 | | 10 | 0 | " | " | 780 | 4.8 |
| Example 5 | | 20 | 0 | " | " | 720 | 4.5 |
| Example 6 | | 30 | 0 | " | " | 700 | 4.1 |
| Example 7 | | 40 | 0 | " | " | 650 | 3.1 |
| Comparative Example 3 | Melamine | 10 | 0 | yes | yes | 730 | 5.0 |
| Comparative Example 4 | Cyanuric acid | 5 | 0 | yes | yes | 850 | 4.6 |

Table 1 shows that the specimens of Examples 1 through 7 had a flame-retarding property higher than that of Comparative Examples 1 and 2 and no blooms were generated on the specimen surfaces of Examples 1 through 7 even after either the dry heat aging or the high humidity aging. However, in Comparative Examples 3 and 4, the dry heat aging and high humidity aging cause the specimens to form white blooms on the surfaces thereof.

EXAMPLES 8 THROUGH 11 AND COMPARATIVE EXAMPLES 5 THROUGH 7

In each of Examples 8 through 11, procedures identical to those described in Example 1 were carried out, except that a copolymer (nylon 66/6), which had been prepared by polymerizing a mixture of 20% by weight of caprolactam and 80% by weight of hexamethylene adipamide salt, and which had a relative viscosity of 2.7, was used in place of the nylon 6, and; the mixture of the copolymer and the flame-retarding agent, in an amount

TABLE 2

| Example No. | Flame-retarding agent Type | Amount (part) | Flammability (sec.) | Formation of white blooms on specimen surface after aging Dry heat | High humidity |
|---|---|---|---|---|---|
| Comparative Example 5 | — | none | 31 | no | no |
| Example 8 | Melamine-cyanuric acid addition salt | 1 | 15 | no | no |
| Example 9 | | 3 | 10 | no | no |
| Example 10 | | 5 | 5 | no | no |
| Example 11 | | 10 | 0 | no | no |
| Comparative Example 6 | Melamine | 10 | 2 | yes | yes |
| Comparative Example 7 | Cyanuric acid | 5 | 0 | yes | yes |

EXAMPLES 12 THROUGH 15 AND COMPARATIVE EXAMPLES 8 AND 9

In each of Examples 12 through 15, the same procedures as those described in Example 1 were carried out, except that nylon 66 resin having a relative viscosity of 2.9 was used instead of the nylon 6, the flame-retarding agent was blended in an amount shown in Table 3 with the nylon 66 resin, at a temperature of 270° C., by means of a double screw extruder, having an inside diameter of 50 mm and being provided with a device for sucking, under a reduced pressure, bubbles generated in the melt in the extruder. The specimens were prepared while removing, under a reduced pressure, bubbles formed in the specimens.

In Comparative Example 8, the same procedures as those mentioned in Example 12 were conducted, except that no flame-retarding agent was used.

In Comparative Example 9, the same procedures as those mentioned in Example 12 were carried out, except that 10 parts by weight of melamine were used in place of the melamine-cyanuric acid addition salt.

The results of the above-mentioned examples and comparative examples are shown in Table 3.

mine in amounts shown in Table 4.

In Example 22, the same procedures as those mentioned in Example 19 were carried out, except that a nylon 6 resin having a relative viscosity of 2.3 was used.

In Example 23, the same procedures as those mentioned in Example 16 were carried out, except that the same nylon 6 resin as that mentioned in Example 22 was used.

In Comparative Example 13, the same procedures as those mentioned in Comparative Example 10 were carried out, except that the same nylon 6 resin as that mentioned in Example 22 was used.

The results of the above-mentioned examples and comparative examples are shown in Table 4.

TABLE 4

| Example No. | Relative viscosity of polyamide | Composition of flame-retarding agent (mole) | | | Amount of flame-retarding agent (part) | Flammability (sec.) | Formation of white blooms on specimen surface after aging | |
|---|---|---|---|---|---|---|---|---|
| | | Melamine | Acetoguanamine | Cyanuric acid | | | Dry heat | High humidity |
| Comparative Example 10 | | — | — | — | none | 42 | no | no |
| Example 16 | | 100 | — | 100 | 10 | 16 | no | no |
| Example 17 | | 99.5 | 0.5 | 100 | 10 | 11 | no | no |
| Example 18 | | 90 | 10 | 100 | 10 | 5 | no | no |
| Example 19 | 2.9 | 80 | 20 | 100 | 10 | 0 | no | no |
| Example 20 | | 70 | 30 | 100 | 10 | 0 | no | no |
| Example 21 | | 50 | 50 | 100 | 10 | 0 | very slight | very slight |
| Comparative Example 11 | | 40 | 60 | 100 | 10 | 0 | yes | yes |
| Example 12 | | — | 100 | 100 | 10 | 0 | yes | yes |
| Comparative Example 13 | | — | — | — | — | 0 | 34 | no | no |
| Example 22 | 2.3 | 80 | 20 | 100 | 10 | 0 | no | no |
| Example 23 | | 100 | — | 100 | 10 | 0 | no | no |

TABLE 3

| Example No. | Flame-retarding agent | | Flam-ma-bility (sec.) | Formation of white blooms on specimen surface after aging | |
|---|---|---|---|---|---|
| | Type | Amount (part) | | Dry heat | High humidity |
| Comparative Example 8 | — | none | 26 | no | no |
| Example 12 | Melamine- | 1 | 13 | no | no |
| Example 13 | cyanuric | 3 | 9 | no | no |
| Example 14 | acid addi- | 5 | 4 | no | no |
| Example 15 | tion salt | 10 | 0 | no | no |
| Comparative Example 9 | Melamine | 10 | 0 | yes | yes |

EXAMPLES 16 THROUGH 23 AND COMPARATIVE EXAMPLES 10 THROUGH 13

In each of Examples 16 through 21, the same procedures as those mentioned in Example 1 were carried out, except that the flame-retarding agent was prepared from cyanuric acid in an amount shown in Table 4 and a mixture of melamine and acetoguanamine in amounts shown in Table 4, and the resultant flame-retarding agent was blended in an amount shown in Table 4 with 100 parts by weight of a nylon 6 resin having a relative viscosity of 2.90. The dry heat aging test was effected at a temperature of 100° C. for 170 hours. The high humidity aging test was conducted at a temperature of 50° C. at a relative humidity of 90° C. for 170 hours.

In Comparative Example 10, the same procedures as mentioned in Example 16 were carried out, except that no flame-retarding agent was used.

In each of Comparative Examples 11 and 12, the same procedures as those described in Example 16 were carried out, except that the flame retardant agent was prepared by using a mixture of melamine and acetoguanamine in amounts shown in Table 4.

Table 4 shows that acetoguanamine is effective for improving the flame-retarding property of nylon 6 resin having a high relative viscosity of 2.9. However, when the molar amount of the acetoguanamine is larger than that of melamine, the resultant flame-retarding agent has a tendency to move from the inside to the surface portion of the shaped article.

EXAMPLES 24 THROUGH 32 AND COMPARATIVE EXAMPLES 14 AND 15

In each of Examples 24 through 28, 100 parts by weight of nylon 6 resin in the form of fine particles having a size of from 100 to 150 microns were mixed with a melamine-cyanuric acid addition salt, which had been prepared by the same method as mentioned in Example 1, by means of a Henschel type mixer. The amount of the addition salt mixed is indicated in Table 5; 90% by weight of the particles of the melamine-cyanuric acid addition salt had a size ranging from 1 micron to 5 microns. The mixture was fed to a single screw extruder, having an inside diameter of 30 mm, to melt and knead it. The melt was extruded from the extruder and formed into pellets. The same size of specimens as mentioned in Example 1 were prepared from the above mentioned pellets of the polyamide composition. The specimens were subjected to the same burning test, tensile strength test and impact strength test as those mentioned in Example 1. Further, the uniformity in the dispersion of the flame-retarding agent was determined as follows. Five pieces of small specimens, each having a weight of from 3 to 5 mg, were cut from the specimens. Each piece was interposed between two glass microscope plates, melted at a temperature of 250°

C. and pressed to form a thin film having a thickness of from 30 to 50 microns. Then, 20 separate areas of each film were observed by means of the image analyzer to determine the number of secondary particles of the flame-retarding agent having a size of 50 microns or more per mg of the test piece. An average of the number of the above-specified secondary particles per mg of the tested pieces is shown in Table 5 to indicate the uniformity in the dispersion of the flame-retarding agent in the polyamide resin.

In comparative Example 14, the same procedures as mentioned in Example 24 were carried out, except that no flame-retarding agent was used and the uniformity in the dispersion of the flame retarding agent was not tested.

In Comparative Example 15, the same procedures as those mentioned in Example 24 were carried out, except that the flame-retarding agent was used in an amount of 45 parts by weight, which amount is outside of the scope of the present invention.

In Example 29, the same procedures as those mentioned in Example 24 were carried out, except that 90% by weight of the particles of the flame-retarding agent had a size ranging from 1 micron to 10 microns and the flame retarding agent was used in an amount of 10 parts by weight.

In Example 30, the same procedures as those mentioned in Example 29 were carried out, except that 90% by weight of the particles of the flame-retarding agent had a size ranging from 1 to 20 microns.

In each of Examples 31 and 32, the same procedures as those mentioned in Example 24 were carried out, except that the flame-retarding agent consisted of mixed crystals of addition salts of 0.5 parts by mole of cyanuric acid, with a mixture of 0.4 parts by mole of melamine and 0.1 part by mole of acetoguanamine, and the flame-retarding agent was used in an amount shown in Table 5.

The results of the above-mentioned examples and comparative examples are shown in Table 5.

tant composition. Furthermore, it was observed that in order to improve the flame-retarding property of the composition, the size of the primary particles of the flame-retarding agent should be as small as possible.

EXAMPLES 33 THROUGH 36

In Example 33, the same procedures as those mentioned in Example 24 were carried out, except that 100 parts by weight of nylon 6 resin having a relative viscosity of 2.45 were mixed with 10 parts by weight of a flame-retarding agent consisting of fine particles of addition salt of melamine with cyanuric acid having a size of from 5 to 20 microns, and the mixture was converted into pellets of a polyamide composition by means of a single screw extruder having an inside diameter of 30 mm.

In each of Examples 34 through 36, the same procedures as those mentioned in Example 33 were carried out, except that 0.5 parts by weight of a dispersing agent of the type indicated in Table 6 were mixed with the mixture of the nylon 6 resin and the flame-retarding agent. The results of Examples 33 through 36 are shown in Table 6.

TABLE 6

| | Polyamide composition | | | |
|---|---|---|---|---|
| Example No. | Dispersing agent | Flammability (sec.) | Tensile strength (kg/cm$^2$) | Number of secondary particles having a size of 50 microns or more per mg of composition |
| Example 33 | none | 13 | 555 | 130 |
| Example 34 | (1) | 1 | 781 | 6 |
| Example 35 | (2) | 5 | 776 | 8 |
| Example 36 | (3) | 0 | 770 | 5 |

Note
(1) Octadecyl-3-(3',5'-di-tert-butyl-4'-hydroxyphenyl)propionate (IRGANOX 1076)
(2) 1,6-hexanediol-bis-(3-(3,5-di-tert-butyl-4-hydroxyphenyl)propionate) (IRGANOX 259)
(3) N,N'—hexamethylene-bis(3,5-di-tert-butyl-4-hydroxy-hydrocinnamide (IRGANOX 1098)

Table 6 shows that the hindered phenol compounds are effective for improving the uniform dispersion of

TABLE 5

| Example No. | Flame-retarding agent Type | Amount (part) | Size (μ) | Number of secondary particles of 50μ size or more per mg of composition | Mechanical Property Tensile strength (kg/cm$^2$) | Breaking elongation (%) | Impact strength (kgcm/cm) | Flammability (sec.) |
|---|---|---|---|---|---|---|---|---|
| Comparative Example 14 | — | none | — | none | 770 | >30 | 5.0 | 31 |
| Example 24 | MC(*) | 3 | 1-5 | 1 | 780 | 20 | 4.9 | 15 |
| Example 25 | " | 5 | 1-5 | 1 | 790 | 20 | 4.8 | 5 |
| Example 26 | " | 10 | 1-5 | 2 | 810 | 15 | 4.5 | 0 |
| Example 27 | " | 20 | 1-5 | 4 | 740 | 11 | 4.2 | 0 |
| Example 28 | " | 30 | 1-5 | 9 | 720 | 8 | 3.9 | 2 |
| Comparative Example 15 | " | 45 | 1-5 | 20 | 650 | 6 | 3.4 | 1 |
| Example 29 | " | 10 | 1-10 | 1 | 800 | 17 | 4.5 | 0 |
| Example 30 | " | 10 | 1-20 | 7 | 790 | 10 | 3.9 | 7 |
| Example 31 | MAC(**) | 10 | 1-5 | 2 | 840 | 15 | 4.4 | 1 |
| Example 32 | " | 20 | 1-5 | 5 | 770 | 10 | 4.1 | 0 |

Note
(*)simple crystals of addition salt of melamine with cyanuric acid
(**)mixed crystals of addition salts of a mixture of melamine and acetoguanamine with cyanuric acid It was observed that the increase in the number of the secondary particles of the flame-retarding agent having a size of 50 microns or more per mg of the composition causes the resultant polyamide composition article to have a low evenness in luster and smoothness of the surface thereof. Also, it was observed that a high uniformity in the dispersion of the flame-retarding agent results in excellent mechanical properties and in excellent evenness in the flame-retarding property of the resultant composition.

the flame-retarding agent in the polyamide matrix. The uniform dispersion of the flame-retarding agent results in an excellent mechanical property and flame-retarding property of the polyamide composition.

What I claim is:
1. A flame retardant polyamide composition comprising:

(a) a polyamide resin as a matrix,
(b) 1 to 40%, based on the weight of said polyamide matrix, of a flame-retarding agent in the form of fine particles dispersed in said polyamide matrix, said flame-retarding agent consisting of at least one member selected from the group consisting of:
  (i) crystals of an addition salt of an acid component selected from cyanuric acid and isocyanuric acid with a basic component consisting of melamine, and;
  (ii) mixed crystals of addition salts of an acid component selected from cyanuric acid and isocyanuric acid, with a basic component consisting of a mixture of melamine and acetoguanamine, the molar amount of said acetoguanamine in said mixture being not larger than that of said melamine and;
(c) 0.1 to 3.0%, based on the weight of said polyamide matrix, of a hindered phenol compound dispersing agent for substantially uniformly distributing said flame-retarding agent in said polyamide resin matrix and for enhancing the mechanical strength of said polyamide resin matrix, said hindered phenol compound being at least one compound selected from the group consisting of octadecyl-3-(3',5'-di-tert.-butyl-4-hydroxyphenyl)propionate, 1,6-hexanediol-bis-[3-(3,5-di-tert.-butyl-4-hyroxyphenyl)-propionate] and N,N'-hexamethylene-bis(3,5-di-tert.butyl-4-hydroxy-hydrocinnamide).

2. A composition as claimed in claim 1, wherein said polyamide is selected from the group consisting of nylon 6, nylon 66, nylon 12, nylon 11, nylon 610 copolymers of nylon 6 and nylon 66, and mixtures of two or more of the above-mentioned polymers.

3. A composition as claimed in claim 1, wherein the amount of said flame-retarding agent is in a range of from 3 to 30% based on the weight of said polyamide matrix.

4. A composition as claimed in claim 1, wherein the amount of acetoguanamine is in a range of from 5 to 30%, based on the weight of said melamine.

* * * * *

UNITED STATES PATENT AND TRADEMARK OFFICE
CERTIFICATE OF CORRECTION

PATENT NO. : 4,383,064
DATED : May 10, 1983
INVENTOR(S) : Hiroshi Iida

It is certified that error appears in the above-identified patent and that said Letters Patent is hereby corrected as shown below:

Column 6, line 51, after "time" insert a comma; after "seconds" insert a comma

Column 12, lines 34 and 35, "hydroxyphenyl" should read -- hydroxyphenol --.

Column 14, line 6, "hydroxyphenyl" should read -- hydroxyphenol --

Signed and Sealed this

Twenty-seventh Day of March 1984

[SEAL]

Attest:

GERALD J. MOSSINGHOFF

Attesting Officer   Commissioner of Patents and Trademarks